United States Patent [19]
DePond et al.

[11] Patent Number: 5,825,852
[45] Date of Patent: Oct. 20, 1998

[54] MULTISENSING CIRCUITRY FOR CLASS SIGNALS AND STUTTER DIAL TONE IN VISUAL MESSAGE WAITING INDICATOR

[75] Inventors: Paul F. DePond, San Mateo; Gaylan Larson; Greg Neal, both of San Jose; David Yewell, Los Altos Hills, all of Calif.

[73] Assignee: Notify Corporation, San Jose, Calif.

[21] Appl. No.: 685,750

[22] Filed: Jul. 24, 1996

[51] Int. Cl.[6] ...................................................... H04M 1/64
[52] U.S. Cl. ................. 379/67; 379/67; 379/88; 379/89; 379/201; 379/215; 379/372; 379/373; 379/376; 379/381; 375/334; 375/340
[58] Field of Search ................. 379/67, 88, 89, 379/201, 215, 372, 373, 376, 381; 375/334, 340

[56] References Cited

U.S. PATENT DOCUMENTS

| | | | |
|---|---|---|---|
| 4,086,441 | 4/1978 | Ullakko et al. | 379/376 |
| 4,582,957 | 4/1986 | Hayes et al. | 379/74 |
| 5,327,493 | 7/1994 | Richmond et al. | 379/372 |
| 5,394,109 | 2/1995 | Simard | 329/300 |
| 5,400,365 | 3/1995 | Tulai | 375/88 |
| 5,436,590 | 7/1995 | Simard et al. | 329/303 |
| 5,483,577 | 1/1996 | Gulick | 379/67 |
| 5,521,964 | 5/1996 | Schull et al. | 379/67 |

*Primary Examiner*—Fan S. Tsang
*Assistant Examiner*—Allan Hoosain
*Attorney, Agent, or Firm*—Marger, Johnson, et al.

[57] ABSTRACT

A VMWI (Visual Message Waiting Indicator) multisense detection device solves both the problem of long CLASS VMWI signal retransmission delays and unreliable CLASS VMWI signal transmission by simultaneously enabling both stutter dial tone detection and CLASS VMWI signal detection. The multisense device samples the line each time the phone is placed on-hook or after the phone goes unanswered after a ring. If a valid CLASS VMWI signal is detected before the scheduled dial tone test, the dial tone test will be canceled. If no CLASS VMWI signal is detected, after a given amount of time, the VMWI device automatically enables stutter dial tone detection. The detection circuitry periodically polls for a preamble field of the CLASS signal to determine whether a valid CLASS signal is about to be transmitted. If the preamble indicates a CLASS signal is being transmitted, the detection circuitry remains on and the CLASS signal is received and processed. If no signal is detected during the time period for the preamble, the detection circuitry is shut off until the next polling period. This polling technique allows the VMWI detection device to operate only on batteries for long periods of time.

5 Claims, 8 Drawing Sheets

MULTISENSING CIRCUITRY FOR CLASS SIGNALS AND STUTTER DIAL TONE IN VISUAL MESSAGE WAITING INDICATOR

BACKGROUND OF THE INVENTION

This invention relates to Visual Message Waiting Indication (VMWIs) circuitry and more particularly to a VMWI device that intelligently detects both CLASS signals and stutter dial tones which are used by telephone companies to alert users regarding the status of their voice mail box.

Regional Bell Operating Companies (RBOCs) and Local Exchange Carriers (LECs) provide central office (CO) based voice mail services to business and residential customers. A shortcoming of these services has emerged over the past few years as the service has reached over 12,000,000 voice mail subscribers. The most frequent subscriber complaint concerning these voice mail services is the lack of visual notification. Currently, voice mail services provide notification to the user with a stutter dial tone. The user must physically pick up the phone and listen for the stutter dial tone. A preferred method would be visual notification that voice messages are in the user's mailbox. A second form of notification is based on a CLASS (Custom Local Area Signaling Services) signal that is transmitted to a subscriber's location and requires a CLASS VMWI detection device.

Stutter dial tone detection on the public phone service was approved by the Federal Communications Commission (FCC) with some limitations on Sep. 28, 1995. One important limitation is a ban on periodic sampling of the phone line. This limitation means that stutter-based VMWI may not detect messages forwarded from another voice mailbox. Other FCC limitations also prevent a stutter detection device from detecting messages cleared by a user from a remote telephone.

The limitations of FCC-approved stutter detection has motivated many telephone companies to offer a second signaling service. VMWI is one of the services defined by the Custom Local Area Signaling Services (CLASS™) specification. CLASS VMWI is based on Frequency Shift Keying (FSK) signals transmitted from the CO whenever new messages are present in the user's voice mailbox and when messages are saved or deleted. CLASS VMWI has few of the limitations imposed on stutter dial tone VMWI. However, CLASS VMWI has several unique problems which can affect reliability.

If a user is on the telephone for a long period of time in a CLASS signaling environment and the CO switch attempts to send a CLASS VMWI signal, the CO switch will recognize that the telephone is off-hook and automatically reschedule the CLASS VMWI signal transmission for a later time. The interval before the CLASS VMWI signal is retransmitted may be as long as 30 minutes. If the user is constantly on the phone, the CLASS VMWI signal could be rescheduled almost indefinitely. As a result, detection of a CLASS VMWI signal could be significantly delayed.

Tests have proven that the CLASS VMWI signal is often blocked when a telephone line is connected to the CO through a Subscriber-Loop Carrier (SLC). Stutter dial tone signaling is unaffected by SLCs.

VMWI circuits require a large amount of power to continuously detect either stutter dial tone VMWI or CLASS VMWI. Additional power is required to activate the visual indicator that reflects a waiting voice mail message. Standard A.C./D.C. power adapters must be connected to a wall socket that may be inconveniently located away from the telephone socket. A.C. power is also more susceptible to temporary outages and power transients than alternative D.C. battery supplies.

Accordingly, a need remains for an energy efficient VMWI circuit that identifies voice mail status more quickly and reliably in a wider variety of telephone systems.

SUMMARY OF THE INVENTION

A VMWI multisense detection circuit solves both the problem of long CLASS VMWI signal retransmission delays and unreliable CLASS VMWI signal transmission by simultaneously enabling both stutter dial tone detection and CLASS VMWI signal detection.

To resolve the delayed CLASS VMWI signal problem, the multisense circuit schedules a sample each time the phone is placed on-hook or after the phone goes unanswered after a ring. If a valid CLASS VMWI signal is detected, the circuit operates only in a CLASS detection mode and cancels the dial tone sample. In the exclusive CLASS detection mode, the phone does not have to be placed temporarily off-hook to detect stutter dial tone. If no CLASS VMWI signal is detected before the scheduled dial tone tests, the VMWI circuit performs the stutter dial tone detection, thus eliminating potentially lengthy delays waiting for the CO to retransmit CLASS signals. The VMWI circuit then operates in a dual CLASS/stutter dial tone detection mode. The multisense mode has the substantial advantage of reevaluating stutter dial tone detection after different voice mail trigger conditions. The reevaluation process looks for the CLASS signal for the predetermined time interval. If the CLASS signal is present, stutter dial tone detection is cancelled for that trigger event. If the CLASS signal is still not detected, stutter dial tone detection remains enabled.

This continuous stutter/CLASS multisense detection scheme allows the VMWI circuit to operate reliably with unreliable CLASS VMWI signal transmissions in an SLC based environment. If no CLASS signal is detected after a triggering event such as an off-hook condition or a no-answer after a ring, the multisense detection unit always switches to a dual sensing mode. For phone lines connected through a SLC, the multisense detection circuit ensures that the VMWI circuit is not "fooled" into operating as a CLASS-only unit by an inconsistent CLASS VMWI signal.

In a stable and prompt CLASS VMWI transmission environment, the CLASS VMWI signal arrives before the stutter dial tone sampling is scheduled to occur. Thus, the multisense circuit does not tax the CO by requesting unnecessary dial tone service.

In another aspect of the invention, the VMWI detection circuitry is designed to operate on a small amount of D.C. power for extended periods of time. The detection circuitry periodically polls for a preamble field of the FSK/CLASS signal to determine whether a valid FSK/CLASS signal is about to be transmitted. If the preamble is detected indicating a CLASS signal, the detection circuitry remains on and the CLASS signal is received and processed. If no preamble is detected, the detection circuitry is shut off until the next polling period. This polling technique allows the VMWI detection unit to operate only on batteries for long periods of time.

The VMWI circuit continuously measures the on-hook and off-hook line voltages and readjusts a reference voltage according to the measured values. The VMWI circuit then uses the reference voltage to detect triggering events such as an off-hook condition. Readjusting the reference voltages allows the VMWI circuit to operate in different telephone systems that have different on-hook and off-hook line voltages.

The foregoing and other objects, features and advantages of the invention will become more readily apparent from the following detailed description of a preferred embodiment of the invention which proceeds with reference to the accompanying drawings.

DETAILED DESCRIPTION

Figure 1:
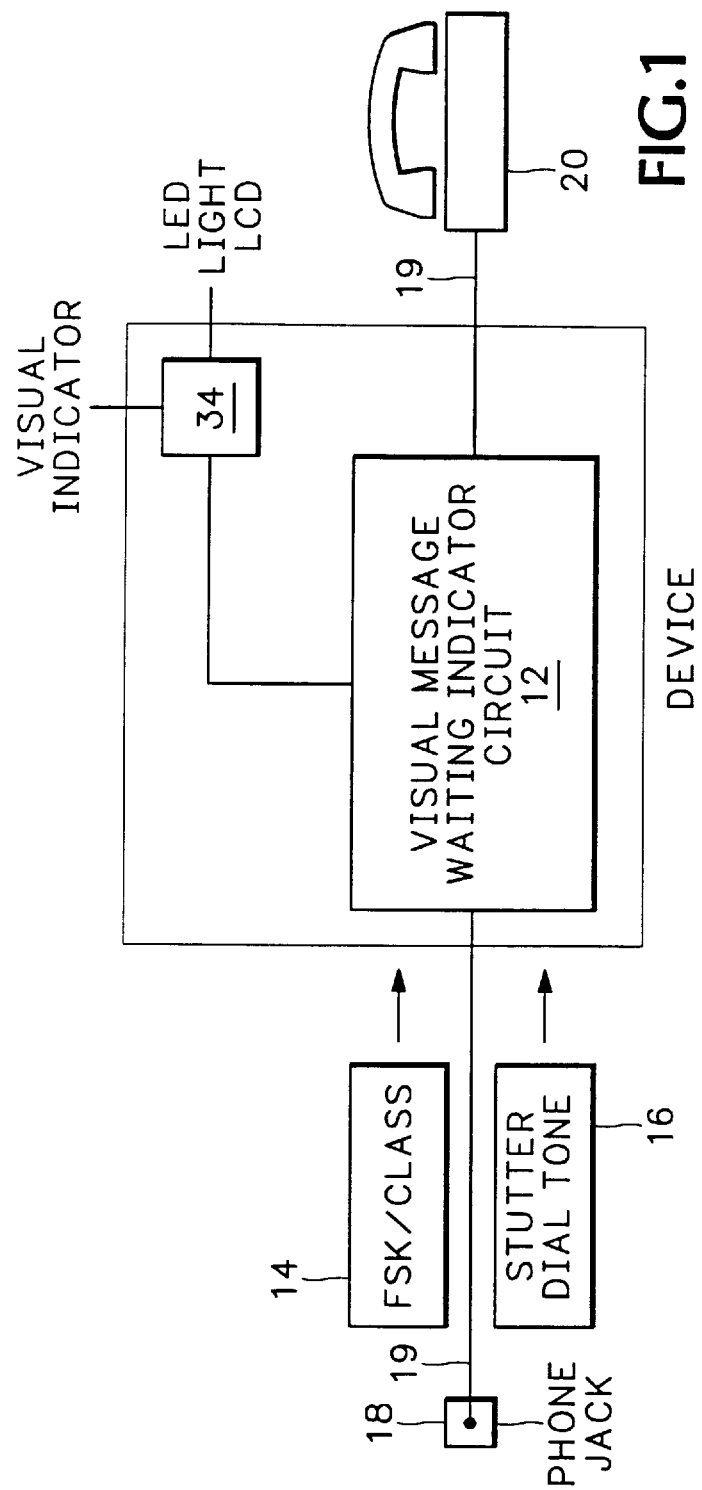
FIG. 1 is schematic diagram of a VMWI multisense circuit inside a device according to the invention.

Referring to FIG. 1, a device containing the visual message waiting indicator (VMWI) circuit 12 and a telephone handset 20 are coupled through a line 19 to a telephone jack 18. The telephone jack 18 is coupled to a telephone line coupled to a central telephone office (not shown). The line 19 receives a frequency shift keying (FSK) CLASS signal 14 or a stutter dial tone signal 16 from the central telephone office to identify waiting voice mail messages.

The VMWI circuit 12 detects either the CLASS signal 14 or stutter tone signal 16 according to different triggering situations described in detail below. If the VMWI circuit 12 detects a CLASS signal 14 identifying a waiting voice mail message, a visual indicator 34 is activated. The VMWI circuit 12 selectively enables stutter dial tone detection if the CLASS signal is not detected after certain triggering conditions. If stutter dial tone detection is enabled and a stutter dial tone signal 16 is detected, the visual indicator 34 is activated. After the visual indicator 13 is activated, the VMWI circuit 12 no longer monitors the stutter dial tone signal 16 until another triggering event occurs. After the next triggering event, if neither the CLASS or stutter dial tone signals are present, light 13 is shut off.

The VMWI circuit 12 is shown located in a separate device from the telephone handset 20. However, it is understood that the VMWI circuit 12 can be integrated inside a variety of devices including the same casing with the telephone handset 20, the same casing with a caller ID unit, the same casing with a personal computer, or the same casing with any number of telephone accessories.

Figure 2:
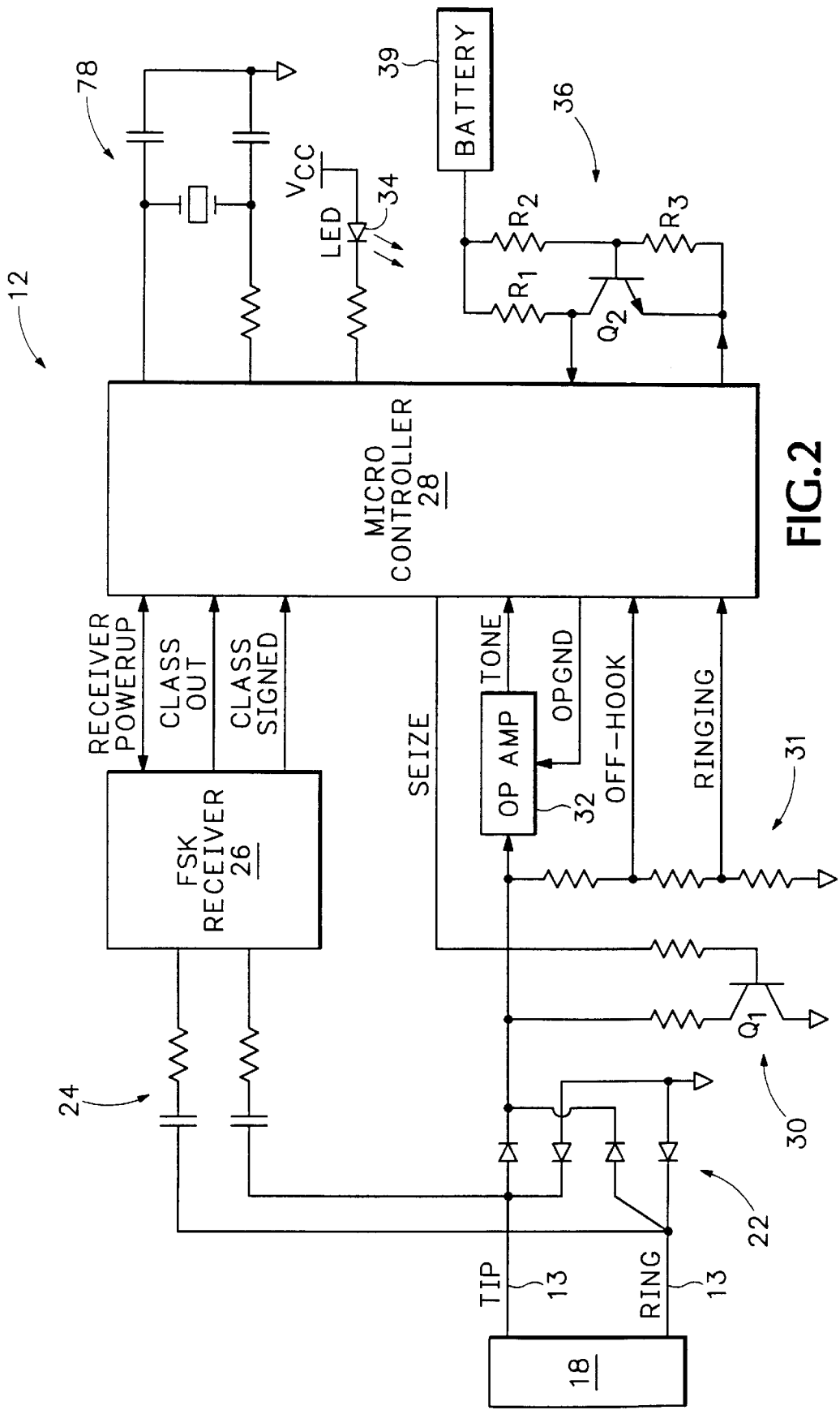
FIG. 2 is a circuit diagram for the VMWI multisense unit shown in FIG. 1.

Referring to FIG. 2, the VMWI signal detection circuit 12 includes an FSK receiver 26 coupled between the telephone lines 13 and a micro-controller 28. A diode bridge circuit 22 couples the tip and ring telephone lines to a transistor 30 and a voltage divider circuit 31. An operational amplifier circuit 32 is coupled between the telephone lines 13 and the micro-controller 28. A light-emitting diode (LED) 34 is activated by the micro-controller 28 during a voice mail waiting condition. A low power monitoring circuit 36 is coupled between a battery supply 39 and the micro-controller 28.

The diodes 22 protect against improperly wired phone jacks. The voltage divider 31 divides the voltage on the telephone line 13 down to particular voltage levels corresponding to an off-hook condition and a phone ringing condition. The micro-controller 28 monitors the OFF-HOOK and RINGING signals to determine triggering conditions that initiate CLASS and stutter dial tone detection schemes. The transistor circuit 30 is activated by the micro-controller 28 to simulate an off-hook condition and then the VMWI circuit 12 is enabled to detect stutter dial tones.

Figure 3:
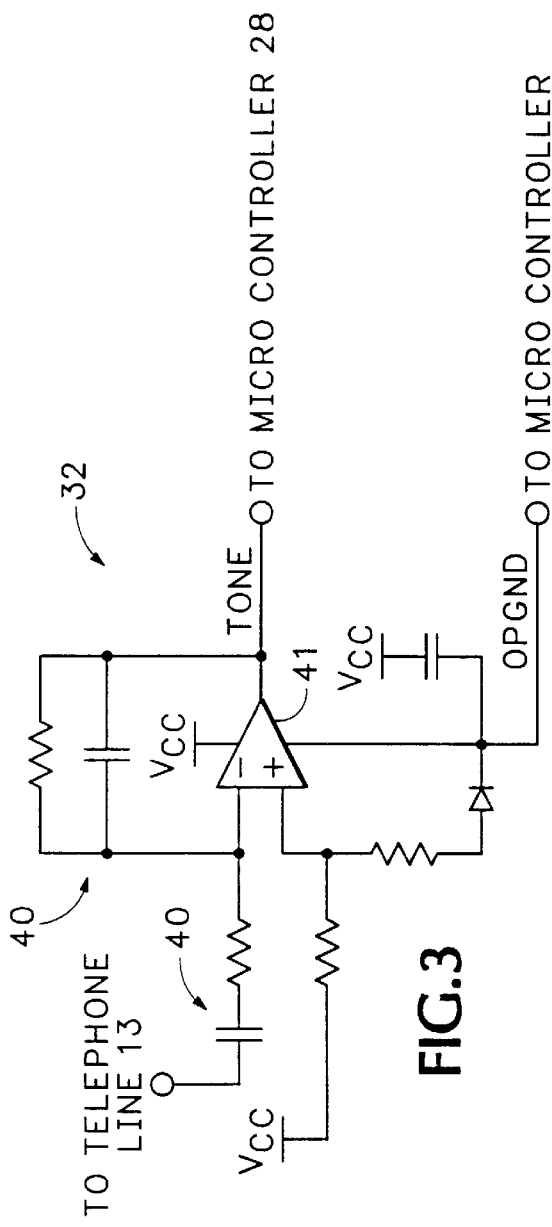
FIG. 3 is a detailed diagram of an operational amplifier circuit for the multisense unit shown in FIG. 3.

The operational amplifier (OP-AMP) circuit 32 is shown in detail in FIG. 3. Telephone lines 13 are coupled to the inverting terminal of an operational amplifier (OP-AMP) 41. The OP-AMP circuit 32 includes a filtering circuit 40 that screens out some low and high frequencies from the telephone lines 13. An output terminal of OP-AMP 41 generates a TONE signal. A power control signal (OPGND) is coupled between the OP-AMP 41 and the micro-controller 28. The amplifier circuit 32 translates signals on the telephone line 13 into square waves and outputs the conditioned TONE signal to the micro-controller 28. The OPGND line is driven by the micro-controller 28 and turns the OP-AMP 41 on and off.

Referring back to FIG. 2, the low power monitoring circuit 36 checks the condition of the battery supply 39. The micro-controller 28 pulls the emitter terminal of transistor Q2 to ground. If the battery supply 39 is higher than 4 volts, transistor Q2 is turned on and the collector terminal of Q2 is pulled low. If the battery supply 39 drops below 4 volts, transistor Q2 does not turn on and the voltage at the collector terminal is not driven low. After pulling the emitter terminal of transistor Q2 to ground, the micro-controller 28 monitors the voltage level at the collector terminal of Q2. After identifying a high logic level at the collector terminal of Q2 (low battery voltage less than 4 volts), the microprocessor blinks the LED 34 twice every second. The double blink of LED 34 identifies a low battery condition to the phone user.

Blinking the LED 34 is performed by the micro-controller 28 by driving the line to the LED 34 to ground for one $\frac{1}{16}$ second period every second. During a low battery condition, the micro-controller 28 double blinks the LED. A double blink comprises driving the line to LED 34 low for a $\frac{1}{32}$ of a second, driving the line high for a $\frac{1}{32}$ of a second, driving the line low again for a $\frac{1}{32}$ of a second and then driving the line high for the remainder of a one second period. The double blink provides an indication to a user of both a voice mail waiting condition and a low battery condition. The fractional activation of LED 34 conserves power used by the VMWI circuit 12.

Stutter Dial Tone Detection

To check for a stutter dial tone, the micro-controller 28 simulates an off-hook condition by activating the SEIZE signal which turns on transistor Q1 30. The micro-controller 28 also turns on the OP-AMP circuit 32 by grounding the OPGND signal. The CO switch responds either with a normal dial tone or, if a message is waiting, a stutter dial tone. The micro-controller 28 identifies a stutter dial tone by monitoring the amplitude of the square waves output from OP-AMP circuit 32. Since the OP-AMP circuit 32 is activated only while checking for stutter dial tone, the amount of energy required to detect stutter dial tones is reduced.

CLASS Signal Detection

Of particular interest is the operation of the frequency shift keying (FSK) receiver 26. The FSK receiver is manufactured by the EXAR Corporation and is well known to those skilled in the art. The capacitor/resistor network 24 isolates D.C. so there is no D.C. load on the telephone line 13 and acts as a filter. The CLASS signal which identifies a message waiting signal can come into the FSK receiver 26 at any time. The receiver typically would be activated continuously to identify any randomly transmitted CLASS signals from the CO. However, continuously activating the receiver 26 requires too much power for a battery-operated VMWI circuit 12 device.

Figure 4:
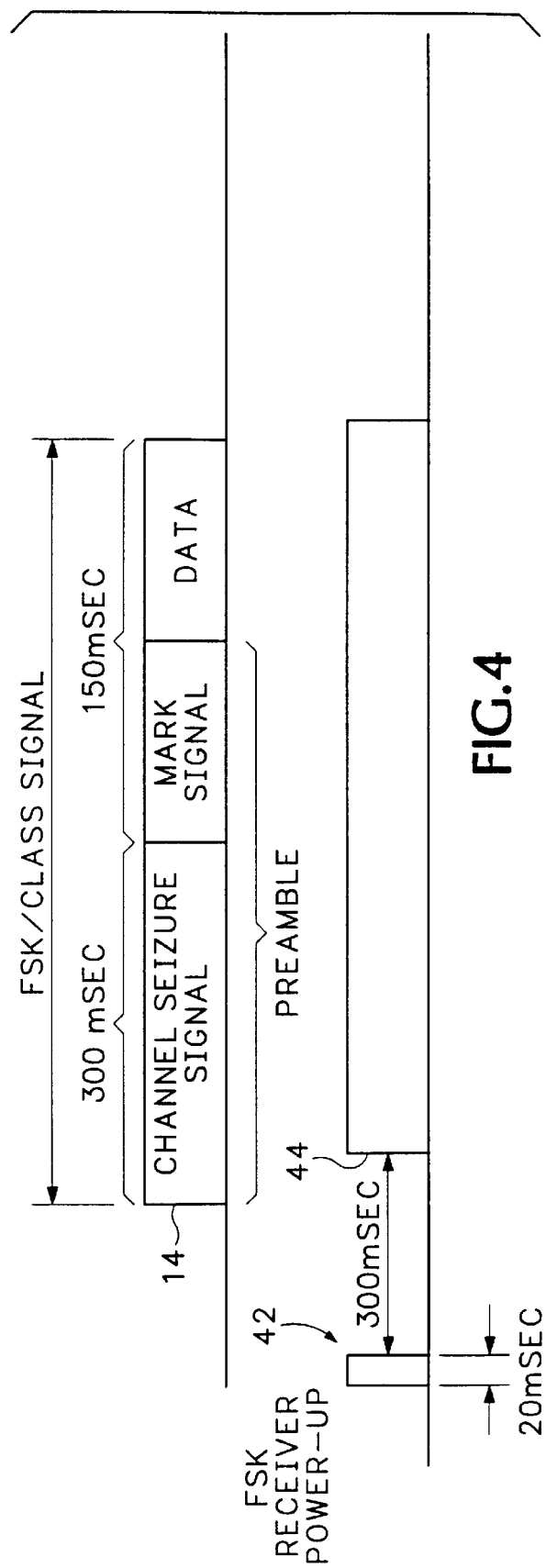
FIG. 4 is a diagram showing the format for a CLASS signal.

To conserve energy, the VMWI circuit 12 conducts a two-phase polling protocol. Referring to FIG. 4, CLASS signals comprise a 250 millisecond channel seizure signal which contains a 12 thousand Hertz (12 KHz) and 22 KHz alternating burst of the CLASS signal. The CLASS signal 14 then includes a mark signal followed by a data bit field. The data bit field contains information regarding voice mail waiting conditions. The channel seizure signal and mark signal together will be referred to as the preamble.

The micro-controller 20 activates the RECEIVER PWRUP signal that turns on the FSK receiver 26 for a 20 millisecond (msec) period. If the receiver 26 does not identify the 1200 Hz and 2200 Hz signals during the 20 msec period 42, the micro-controller 28 shuts off the receiver 26.

The micro-controller turns the receiver 26 back on after 250 msecs at time period 44. If the preamble is detected during the second 20 millisecond interval, the micro-controller 28 keeps the receiver on for decoding the data field. The micro-controller 28 turns the LED 34 on when the data field of the CLASS signal 14 indicates a voice mail waiting condition or turns the LED 34 off if the data field indicates a no voice mail waiting condition.

The time period that the micro-controller 28 uses to poll the preamble ensures detection of the preamble 14. Polling activation periods less than 20 msecs can be repeated for periods longer than 250 msecs and still detect the CLASS signal thereby further increasing power conservation. Other polling techniques are also possible and come within the scope of the invention.

Other CLASS VMWI receivers remain in a continuous powered-on state. The receiver in VMWI circuit 12 is turned on for short time periods while polling for a valid CLASS signal. Thus, the VMWI circuit 12 uses only a fraction of the energy of current CLASS detection circuits. As a result, the VMWI circuit 12 can be powered by four AA batteries for approximately one year. Battery power allows the VMWI circuit 12 to be installed more easily in different phone locations, operate more reliably during A.C. power line outages and prevents damage from A.C. power surges.

Figure 5:
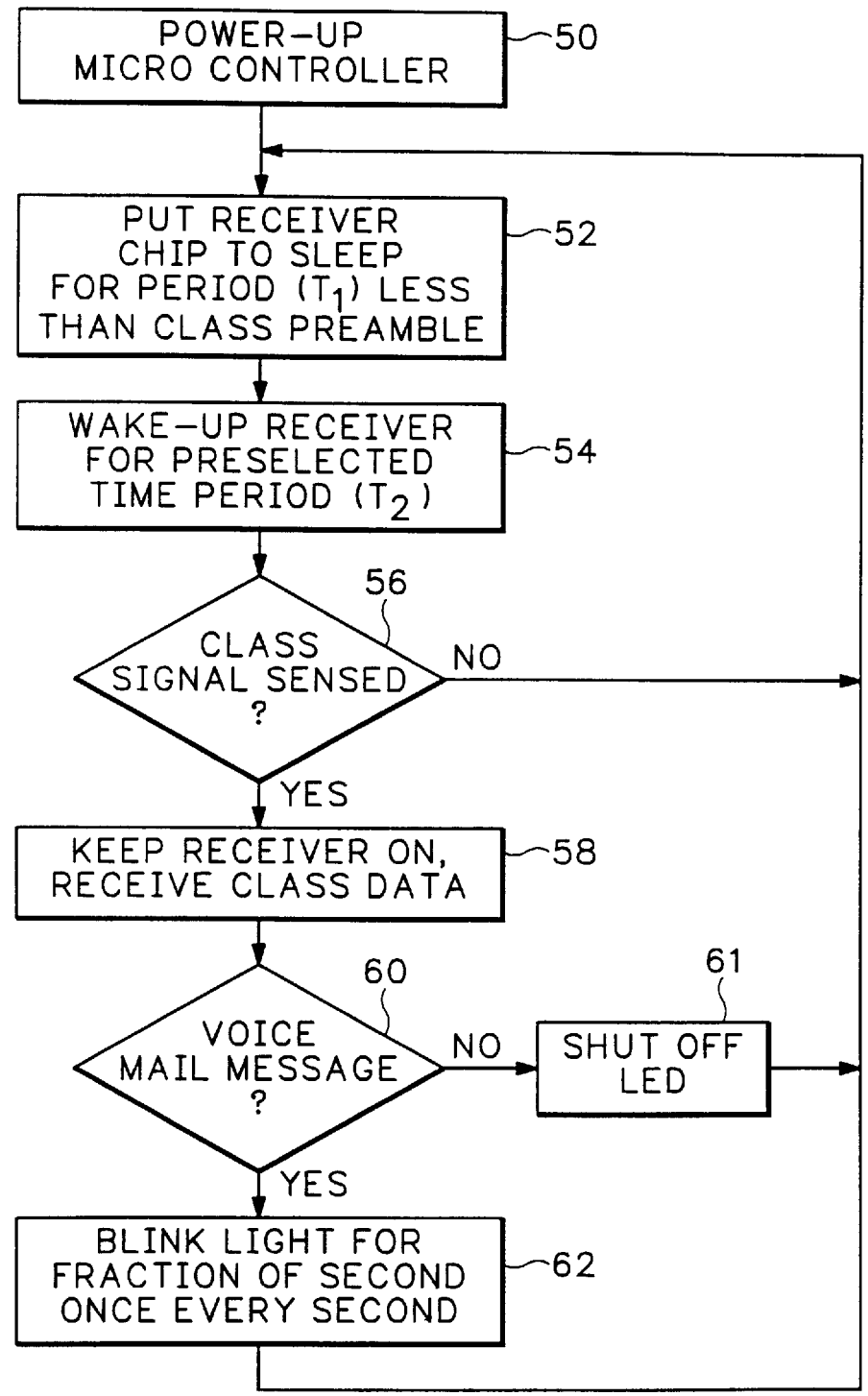
FIG. 5 is a detailed step diagram of a FSK/CLASS polling technique used by the VMWI multisense circuit in FIG. 1.

FIG. 5 is a step diagram describing the steps performed by the VMWI circuit 12 when polling the CLASS signal 14. The micro-controller 28 of the VMWI circuit 12 is powered up in step 50. In step 52, the micro-controller 28 puts the FSK receiver 26 to sleep for a predetermined period of time (T1). The time period T1 is less than the time period of the preamble of the CLASS signal 14 (FIG. 4). For example, the preamble for the CLASS signal 14 is 400 milliseconds. Accordingly, the micro-controller 28 is preprogrammed to turn on the FSK receiver 26 at a time period T1 of 300 msecs. In step 54, the micro-controller 28 is programmed to keep the FSK receiver on during each polling period for a duration T2. In the embodiment shown in FIG. 4, the time period T2 is 20 msec.

Decision step 56 determines whether the CLASS frequency exists in the preamble. If no CLASS signal is detected, the micro-controller 28 jumps back to step 52, shutting off the FSK receiver 26 until the next sampling time T1. If the CLASS signal is detected, the micro-controller 28 keeps the FSK receiver 26 on in step 58 to read the data field of the CLASS signal 14. Decision step 60 processes the CLASS data to determine if a voice mail message exists or has been deleted.

If no voice mail message is identified and the LED 34 was previously activated, the micro-controller 28 turns off the LED 34 in step 61. The VMWI circuit 12 then jumps back to step 52 and puts the FSK receiver back to sleep until the next time period T1. If a voice mail message is indicated by the CLASS signal 14, the micro-controller 28 activates the LED 34 in step 62. To conserve energy, the LED 34 is blinked once every second for a fraction of a second. The VMWI circuit 12 then puts the FSK receiver 26 back to sleep until the next polling period T1.

VMWI Multisensing

As described above, the VMWI circuit 12 operates for both stutter dial tone and CLASS signal environments. Not only does the VMWI circuit 12 operate in both environments, but maximizes performance of voice mail detection by exploiting the advantageous characteristics of both the CLASS and stutter dial tone signals transmitted from the CO.

Figure 6:
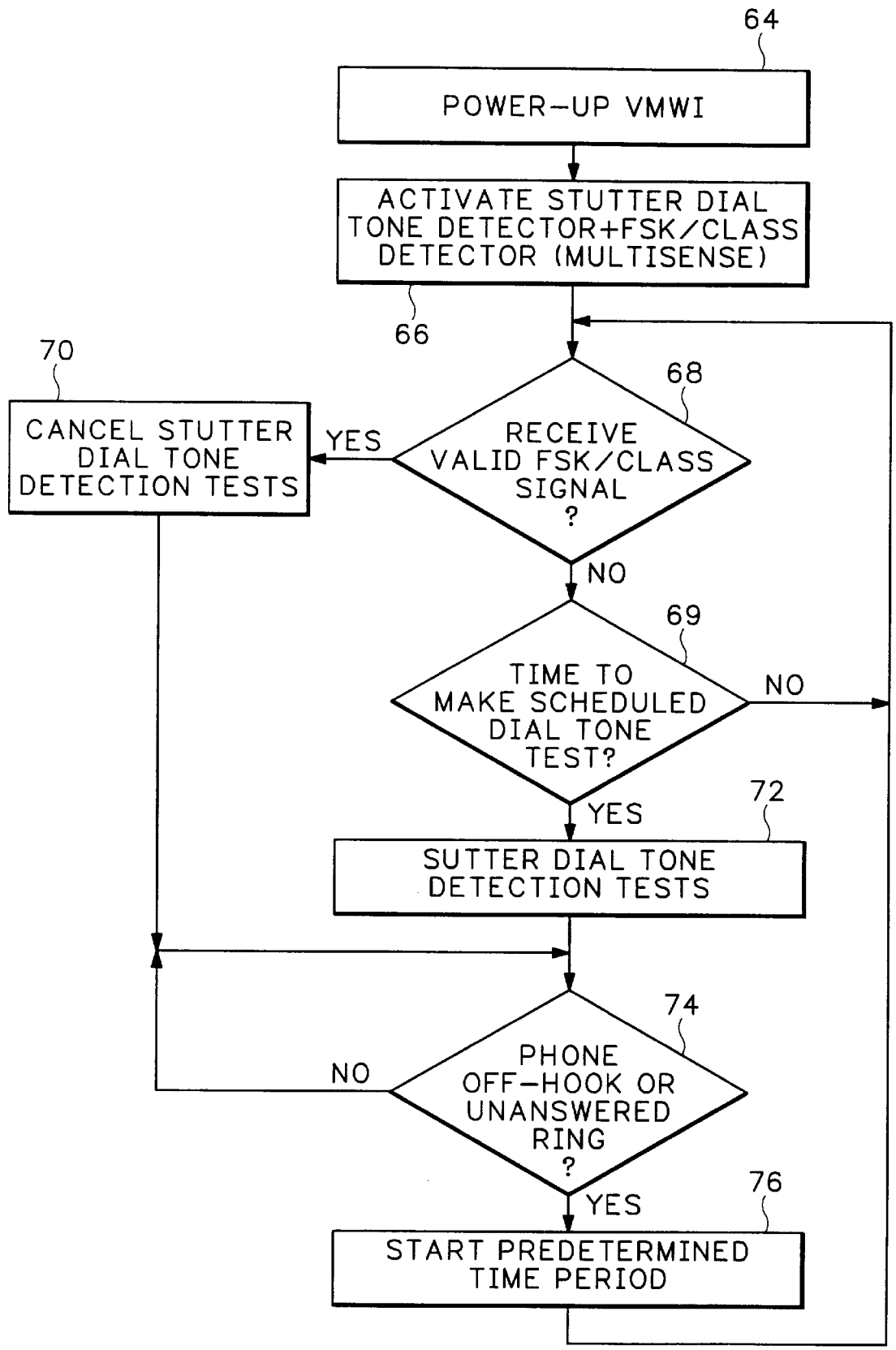
FIG. 6 is a step diagram showing the dual mode multi-sensing technique conducted by the VMWI multisense circuit shown in FIG. 1.

Referring to FIG. 6, the VMWI circuit 12 is powered up in step 64. Stutter dial detection and CLASS signal detection are both enabled in step 66 at initial power up (multisensing). Decision step 68 periodically monitors for a CLASS signal as described above in FIG. 5. If a CLASS signal is detected, stutter dial tone detection is cancelled in step 70. If the CLASS signal is not detected by the VMWI circuit 12, decision Step 69 then continues to monitor for a valid FSK/CLASS signal until a scheduled time for a dial tone test. Step 72 conducts a stutter dial tone detection test.

Of significant importance in the current invention is the detection evaluation process that takes place after every voice mail triggering condition. Decision step 74 represents two triggering conditions which may prelude leaving a voice mail message. For example, voice mail messages are often left if a caller is attempting to make a call to a telephone number that is currently in use. Thus, one triggering condition occurs any time the telephone is put back on hook. Voice mail messages may also be left after a phone goes unanswered after ringing. Thus, a second trigger condition is prompted by a telephone ring that is not followed by an off-hook condition.

Decision step 74 continuously monitors for any one of the possible voice mail waiting triggering conditions described above. At the same time, the micro-controller 28 continues to periodically poll for the CLASS signal. If a triggering condition occurs, step 76 sets a predetermined amount of time and then jumps back to decision step 68. The time period is around 30 seconds after an off-hook condition and around four minutes after a ring no-answer condition. Decision step 68 again determines whether a CLASS signal was transmitted from the CO during the predetermined time period. If no CLASS signal was detected, stutter dial tone is tested in step 72.

A central telephone office generally generates a stutter dial tone representing a voice mail waiting condition with higher priority than a CLASS signal identifying a similar voice mail waiting condition. For example, a CLASS signal may be transmitted several minutes after a telephone is placed "on-hook". Conversely, a stutter dial tone signal is transmitted within a few seconds after identifying the voice mail condition. If a phone operator is continuously on the phone, a VMWI circuit 12 may indefinitely delay detection of a voice mail message from a CLASS signal.

Because stutter dial tone detection is automatically reenabled after a predetermined time period, the VMWI circuit 12 can detect voice mail messages more quickly than a VMWI system detecting only CLASS signals. Further, the VMWI circuit 12 continues to monitor for CLASS signals and accordingly cancels stutter dial tone detection when a CLASS signal is detected. Thus, the VMWI circuit 12 will not burden the central telephone office by unnecessarily taking the phone off-hook to detect stutter dial tone if the CLASS signaling environment is available.

Thus, the VMWI circuit 12 maximizes performance of voice mail detection by exploiting the different characteristics of both the CLASS and stutter dial tone signals transmitted from the CO. For stutter dial tone, the VMWI circuit 12 exploits the quicker stutter tone response time after an on-hook/off-hook condition. For CLASS signaling, the VMWI circuit 12 takes advantage of the more robust controlling environment of CLASS signaling which also allows detection of voice mail waiting conditions without taking the telephone off-hook.

The VMWI circuit 12 has the added advantage of reliable operation in Subscriber Loop Carrier (SLC). SLCs intermittently pass CLASS signals to residential phones. The VMWI circuit 12 continues to reevaluate, and possibly reconfigure detection modes, for each voice mail triggering conditions. Thus, the VMWI circuit 12 is not lulled into unreliable voice mail detection modes.

Micro-controller CLASS Signal Detection and Self Calibration

In another embodiment of the invention, the micro-controller 28 detects the CLASS/FSK signal without using FSK receiver 26. The micro-controller 28 uses internal voltage comparators and amplifiers to detect the CLASS signal. Because a power intensive FSK receiver chip is not used, the VMWI circuit 12 operates on battery power for longer periods of time and is less expensive to manufacture.

Figure 7:
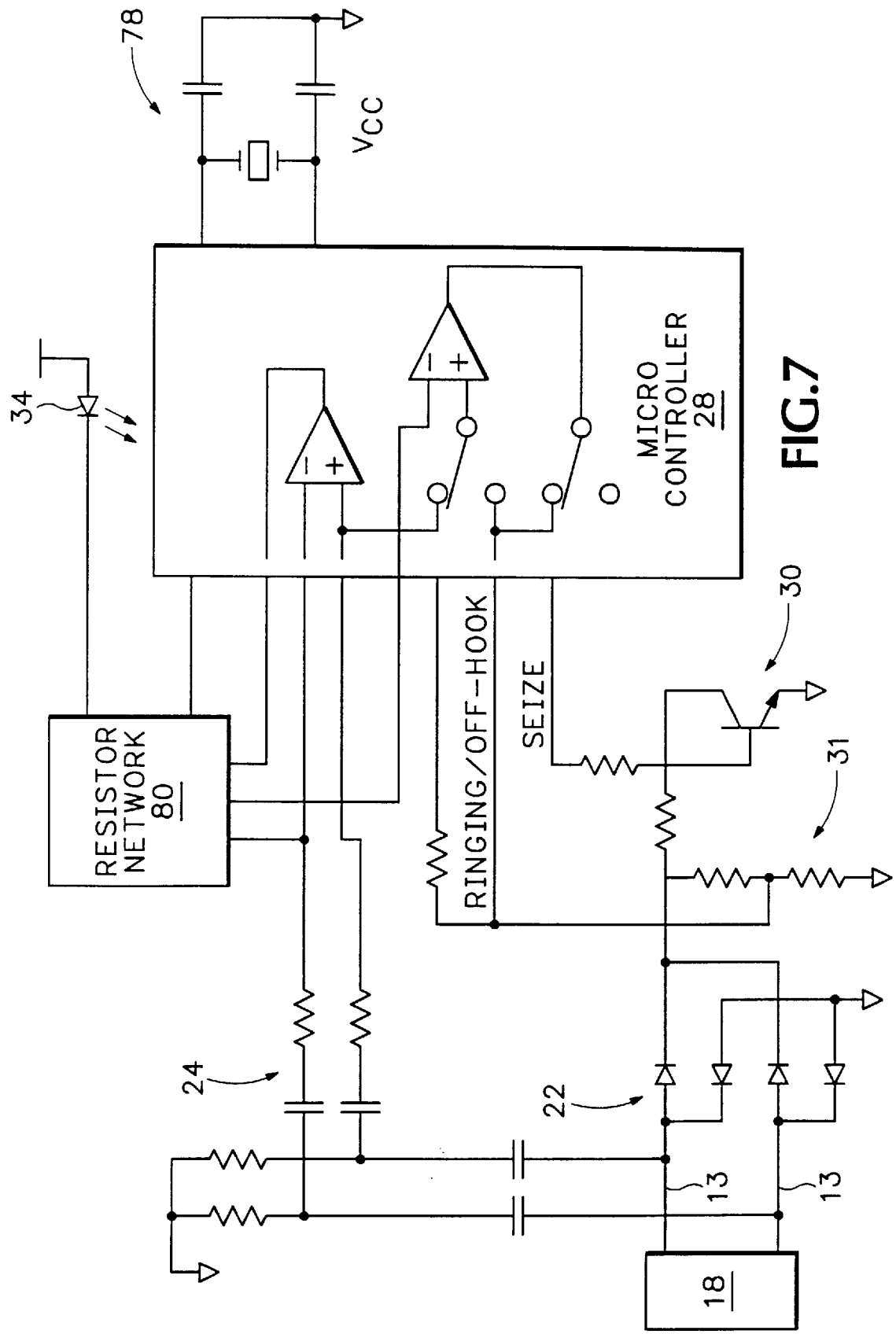
FIG. 7 is another embodiment of the invention.

Referring to FIG. 7, the telephone lines 13 are coupled into mircocontroller 28. An oscillator circuit 78 and a resistor network 80 are each coupled to the micro-controller 28. The mircocontroller 28 is a model number 16LC621 manufactured by Microchip, Inc. The micro-controller 28 includes multiple internal comparators and detects the FSK/CLASS signal and stutter dial-tone through telephone lines 13. On-hook and off-hook voltages and ringing signals are monitored from the voltage divider circuit 31. Resistors in network 80 are selectively coupled to ground or placed at floating voltage levels to generate different D.C. voltage levels for comparing to the different input signals.

The micro-controller 28 places itself in a sleep mode when not testing for the CLASS signal as described above in FIG. 2. If the preamble is detected, the micro-controller 28 remains on and decodes the digital data field of the CLASS signal. If the preamble is not detected, the micro-controller 28 does back to sleep for 300 msec until the next sampling period.

Figure 8:
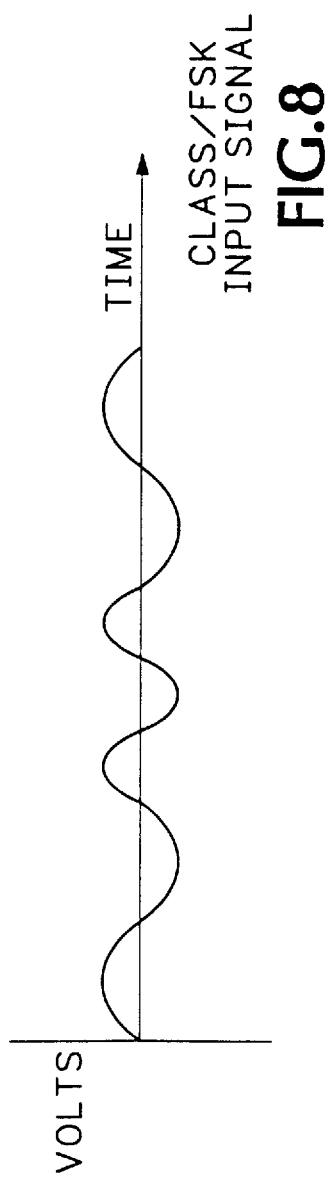
FIG. 8 is a diagram of a CLASS input signal.
Figure 9:
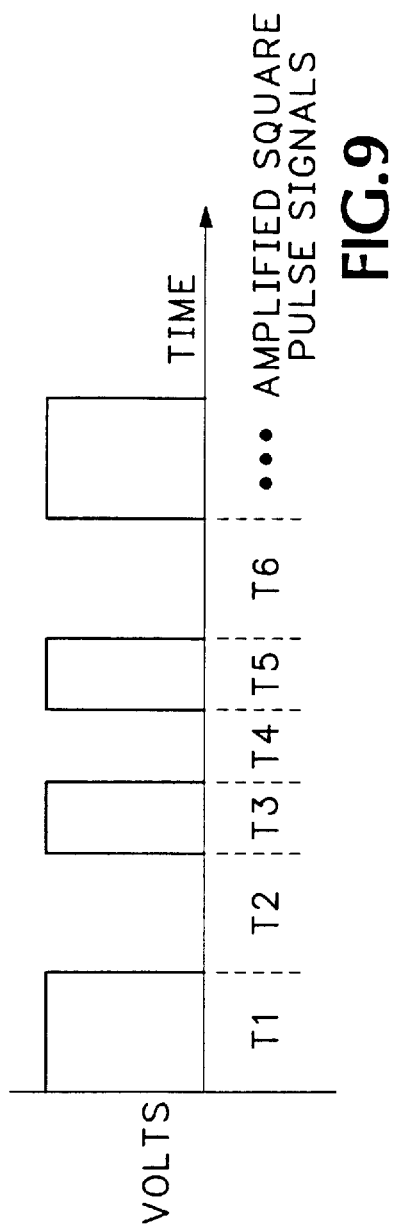
FIG. 9 is a diagram of amplified pulses generated from the input signal shown in FIG. 8.

The CLASSIFSK input signal on telephone lines 13 is shown in FIG. 8. The CLASS/FSK signal comprises a sinusoidal wave alternating between a positive half cycle and negative half cycle. The micro-controller 28 amplifies the positive half cycle of the CLASS/FSK signal into a square pulse as shown in FIG. 9. The micro-controller counts the number of clock cycles from the rising edge to the falling edge of the first pulse reflecting the time period T1 of the first positive half cycle. The micro-controller 28 then counts the number of clock cycles from the falling edge of the first pulse to the rising edge of the next pulse reflecting the time period T2 of the negative half of the first cycle.

The micro-controller 28 compares the time periods T1 and T2 with prestored values for T1 and T2 for a 1200 Hertz signal. For example, if the measured T1 is approximately 0.5 milliseconds and the measured T2 is approximately 0.5 milliseconds, then the input signal is considered a 1200 Hertz FSK/CLASS signal. Pulses T3 and T4 represent the amplified square pulses for a 2200 Hertz FSK/CLASS signal. If a 1200 Hertz signal or a 2200 Hertz signal is detected, the micro-controller 28 remains in an active state and decodes the digital data field of the CLASS signal.

A logical filtering process is conducted by the micro-controller 28. If multiple voltage spikes occur within a predetermined number of clock periods, the micro-controller 28 considers the group of spikes to be all part of the same sinusoidal half-cycle. However, if only one spike or a few random spikes are detected, the micro-controller ignores the spikes as noise.

During the sleep mode, the micro-controller 28 shuts-off power to the oscillator circuit 78 and runs off a watch dog timer internal to the micro-controller 28. The watch dog timer is always running even when the oscillator 78 is running. Generally, internal timer circuits are not as accurate as externally connected oscillator circuit 78. If more than one VMWI circuit 12 is connected to the same telephone line, FCC regulations requires each VMWI circuit 12 to test for stutter dial tone at the same time. However, if the timing for the internal clocks of each VMWI circuit 12 are slightly different, the VMWI circuit 12's may simulate off-hook conditions at different times.

To eliminate timing inconsistencies between multiple VMWI circuit 12's, the micro-controller 28 continuously recalibrates the internal watch dog timer. The watch dog timer is always running including while the micro-controller 28 is shut-off during a sleep mode. About every minute, when the micro-controller 28 clock is running, the watch dog timer is reset. The micro-controller 28 measures the time taken by the watch dog timer to time out according to the crystal oscillator circuit 78. This timing measurement is then used to update timing calculations which determine how long the micro-controller 28 will wait to test for stutter dial tone after a triggering event.

Self Calibration For Off-Hook Voltage

Normal on-hook voltage for a telephone system is 50 volts and normal off-hook voltage for a telephone system is 6 to 10 volts. A reference voltage of around 20 volts is used to detect a change from an on-hook condition to an off-hook condition. However, many telephone systems have inconsistent on-hook and off-hooks voltages. For example, SLCs have on-hook and off-hook voltages that are substantially different than the typical 50 volt on-hook and 6–10 volt off-hook condition. The following is a list of corresponding on-hook and off-hook voltage measurements taken from residential telephone line voltages.

| On-Hook Voltage | Off-Hook Voltage |
| --- | --- |
| 12.5 v | 6.5v |
| 12.0 v | 7.0v |
| 12.0 v | 9.0v |
| 24.0 v | 5.0v |
| 20.0 v | 4.0v |
| 62.0 v | 9.5v |
| 14.0 v | 7.5v |
| 13.0 v | 7.0v |
| 56.0 v | 16.0v |

As shown in the above voltages, a single reference voltage set at 20 volts would not be accurate in detecting changes between an on-hook and off-hook condition for each of the telephone line voltages shown above. The present invention readjusts the reference voltage for the current telephone line voltage to ensure accurate on-hook and off-hook detection for any telephone system.

Figure 10:
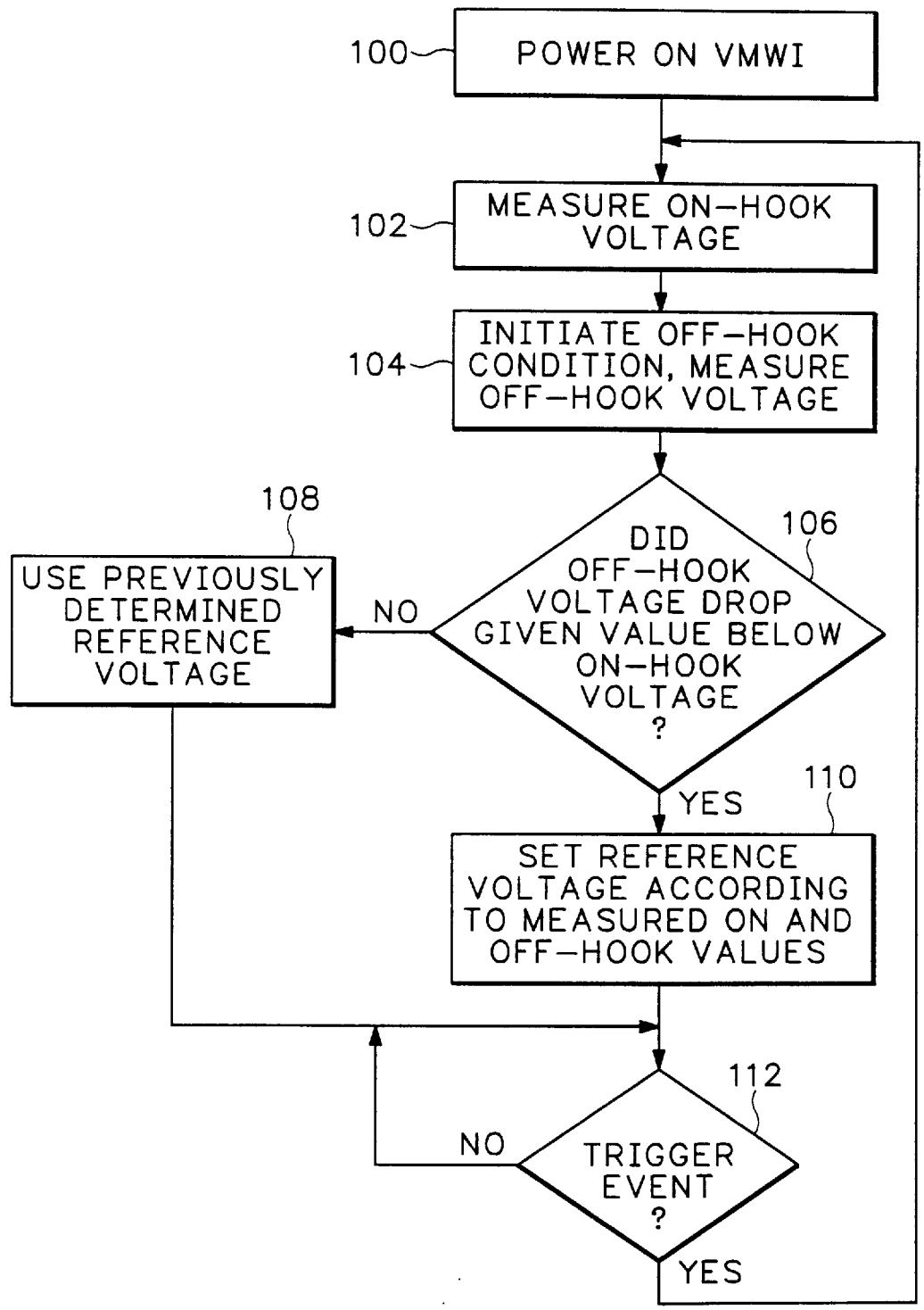
FIG. 10 is a step diagram of the on-hook and off-hook voltage calibration performed by the VMWI circuit.

Referring to FIG. 10, the VMWI circuit 12 is powered on in step 100 and the on-hook voltage is measured in step 102. Step 104 initiates an off-hook condition by turning on transistor 30 (FIGS. 2 and 7) through the seize line. After the telephone lines 13 are seized and a dial tone (or stutter dial tone) is heard, the off-hook line voltage is measured again. Decision step 106 compares the measured on-hook voltage with the measured off-hook voltage. If the off-hook voltage is not at least two volts below the on-hook voltage, the previous reference voltage is retained in step 108. For example, if the on-hook voltage was measured while someone was using the phone, the measured on-hook voltage and measured off-hook voltage would be about the same. The micro-controller 28 rejects any on-hook and off-hook measurements that do not change by the predefined minimum voltage difference.

If the difference between the on-hook and off-hook voltage is greater than two volts, step 110 sets a new reference voltage by taking the average of the on-hook and off-hook voltage. For example, if the measured on-hook voltage is 12.0 volts and the measured off-hook voltage is 8.0 volts, the micro-controller 28 sets the reference voltage to 10.0 volts. Whenever the telephone line voltage drops below 10.0 volts, the VMWI circuit 12 considers the phone to be in an off-hook condition. Decision step 112 waits for another trigger event and then remeasures the on-hook and off-hook voltages before updating the reference voltage. Thus, the VMWI device 12 operates in a wider variety of telephone systems having different on-hook and off-hook voltage levels.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for detecting voice mail messages with a voice mail message waiting indicator coupled to a telephone line receiving the voice mail messages from a central location, comprising:

enabling the voice mail message waiting indicator to electronically monitor the telephone line for a stutter dial tone that identifies voice mail message status by simulating an off-hook condition in the telephone line and electronically detecting the stutter dial tone while the telephone line is in the simulated off-hook condition;

enabling the voice mail message waiting indicator to also electronically monitor the telephone line for a CLASS signal that identifies voice mail message status while the telephone line is in an on-hook condition, the CLASS signal automatically detected on the telephone line without acknowledging activation of the voice massage waiting indicator to the central office;

activating a visual indicator when the voice message waiting indicator detects one of the stutter dial tone and the CLASS signal, the visual indicator visually identifying both stutter dial tone identified voice mail messages and also CLASS signal identified voice mail messages without subscribing or acknowledging subscription to an additional visual voice mail waiting indicator service with suppressed ringing; and monitoring the telephone line for a triggering event that identifies initiation of a telephone call.

2. A visual voice message waiting indicator circuit, comprising:

a telephone line coupled to a telephone for carrying a stutter dial tone providing waiting status of a voice mail message, a CLASS signal automatically generated from a central office providing waiting status of the voice mail message and a triggering event identifying an off hook condition or an unanswered ring;

a receiver coupled between the telephone line and the signal detection circuit for receiving both the stutter dial tone in an off-hook condition and detecting the CLASS signal in an on-hook condition without acknowledging receiver activation for CLASS signal detection to the central office;

a signal detection circuit coupled to the telephone line and the telephone, the signal detection circuit detecting both the stutter dial tone and the CLASS signal and automatically disabling a portion of the receiver detecting the stutter dial tone after detecting the CLASS signal and automatically reenabling the portion of the receiver detecting the stutter dial tone when the CLASS signal is not detected without additional signaling from the central office; and a visual indicator coupled to the signal detection circuit activated for both stutter dial tone detected voice mail messages and also CLASS signal detected voice mail messages.

3. A method for detecting voice mail messages, comprising:

monitoring a telephone line for triggering events that indicate possible changes to a voice mail waiting condition;

electronically monitoring the telephone line in an on-hook condition for a first voice mail indicator signal transmitted from a central office for a given time period after detecting one of the triggering events without subscribing to a suppressed ringing service;

initiating automatic electronic monitoring of the telephone line in an off-hook condition for a second voice mail indicator signal from the central office when the first voice mail indicator signal is not detected after the given time period while continuing monitoring of the telephone line for the first voice mail indicator signal, the first and second voice mail indicator signals electronically monitored passively without acknowledging monitoring to the central office and without subscribing to additional visual voice mail waiting indication signaling with suppressed ringing; and activating a visual indicator when the first voice mail indicator signal identifies the voice mail waiting condition and also when the second voice mail indication signal identifies the voice mail waiting condition.

4. A visual voice message waiting indicator circuit, comprising:

a telephone line coupled to a telephone for carrying any of a first voice mail message signal transmitted from a central telephone office, a second voice mail message signal transmitted from a central telephone office, the first and second voice mail message signals providing both notification that a voice mail message exists and notification that the voice mail message has been cleared;

a receiver coupled to the telephone line detecting both the first voice mail message signal by simulating an off-hook condition and also detecting the second voice mail message signal while in an on-hook condition;

a signal detection circuit coupled to the receiver selectively enabling and disabling detection of the first voice mail message signal in the receiver according to detection of the second voice mail message signal; and a visual indicator activated by the signal detection circuit both when the first voice mail message signal is detected by the receiver providing notification of the voice mail message and also when the second voice mail message signal is detected by the receiver providing notification of the voice mail message, the visual indicator automatically deactivated by the signal detection circuit when the first and second voice mail message signal provide notification that the voice mail message has been cleared.

5. A visual voice message waiting indicator circuit, comprising:

a receiver coupled to a telephone line that receives a first and second voice mail message status signal each providing notification of a voice mail message and notification that the voice mail message has been cleared, the first voice mail message status signal detectable in an on-hook condition and the second voice mail message status signal detectable only in an off-hook condition, the receiver operating passively without transmitting a voice mail message activation acknowledgment signal to a voice mail system;

a signal detection circuit coupled to the telephone line and the telephone, the signal detection circuit detecting both the first and second voice mail message status signals; and a visual indicator activated when the first voice mail message status signal notifies the signal detection circuit of the voice mail message and also when the second voice mail message status signal notifies the signal detection circuit of the voice mail message, the visual indication also automatically deactivated when the first voice mail message signal notifies the signal detection circuit that the voice mail message has been cleared and when the second voice mail message signal notifies the signal detection circuit that the voice mail message has been cleared.

* * * * *